(12) United States Patent
Rudd

(10) Patent No.: US 8,082,785 B2
(45) Date of Patent: Dec. 27, 2011

(54) INDUCTIVE LIQUID-LEVEL SENSOR

(75) Inventor: Jeffrey P. Rudd, Foxboro, MA (US)

(73) Assignee: Illinois Tool Works Inc., Glenview, IL (US)

( * ) Notice: Subject to any disclaimer, the term of this patent is extended or adjusted under 35 U.S.C. 154(b) by 455 days.

(21) Appl. No.: 12/481,245

(22) Filed: Jun. 9, 2009

(65) Prior Publication Data

US 2010/0024545 A1    Feb. 4, 2010

Related U.S. Application Data

(60) Provisional application No. 61/085,266, filed on Jul. 31, 2008.

(51) Int. Cl.
*G01F 23/00* (2006.01)
*G08B 21/00* (2006.01)

(52) U.S. Cl. .......................................... 73/313; 340/623

(58) Field of Classification Search .................... 73/313, 73/319, 305; 340/623
See application file for complete search history.

(56) References Cited

U.S. PATENT DOCUMENTS

| 4,627,280 A | 12/1986 | Hayashi et al. |
| 5,815,091 A * | 9/1998 | Dames et al. ............ 340/870.34 |
| 2001/0054312 A1 * | 12/2001 | Czarnek ....................... 73/313 |
| 2002/0157465 A1 * | 10/2002 | Marioni ........................ 73/313 |
| 2007/0186648 A1 * | 8/2007 | Harmon et al. ................ 73/319 |

* cited by examiner

*Primary Examiner* — Hezron E Williams
*Assistant Examiner* — Jamar Ray
(74) *Attorney, Agent, or Firm* — Mark W. Croll; Paul F. Donovan

(57) ABSTRACT

An inductive liquid-level sensor employs a central shaft supporting multiple independent electrical loops that may be interrogated to detect the proximity of the conductive element in the float rising and falling with changes in liquid height outside of the shaft.

13 Claims, 2 Drawing Sheets

INDUCTIVE LIQUID-LEVEL SENSOR

CROSS REFERENCE TO RELATED APPLICATION

This Non-Provisional Application claims benefit to U.S. Provisional Application Ser. No. 61/085,266 filed Jul. 31, 2008 hereby incorporated by reference.

FIELD OF THE INVENTION

The present invention relates to liquid-level sensors, particularly sensors that may be suitable for use in monitoring urea levels in diesel engine emission control systems such as those using "selective catalytic reduction" (SCR).

A wide variety of liquid-level sensing technologies exist including those using ultrasonic signals, changes in capacitance, and changes in electrical resistance. One type of liquid-level sensor employs a loop, for example contained within a hollow shaft extending into the liquid. A float with a metal slug may slide up and down along the shaft with changes in the liquid height. The location of the metal slug along the length of the loop changes the inductance or mutual inductance of the loop which may be measured and converted into a voltage or digital signal indicating the height of the liquid.

Such inductive systems can require careful calibration in order that a given inductance value of the loop match a predetermined float height under normal manufacturing variations. Differences in the measurement environment, wear, or damage that change the calibration, can result in measurement errors.

SUMMARY OF THE INVENTION

The present invention provides an inductive liquid height sensor employing a set of electrically independent loops each of which may separately sense the proximity of a metallic ring in a float. By interrogating the loops, the location of the float and thus the liquid height may be readily determined without the need for precise measurements of inductance. By reducing the inductance measurement to a simple threshold detection, the sensitivity of the circuitry to manufacturing variations and tuning drift is greatly reduced.

Specifically then, the present invention provides a liquid-level sensor having a shaft that may extend along an axis in a vertical direction in a liquid holding tank and a float positioned to move along the shaft with changes in liquid height within the tank. The float may include at least one conductive element for interaction with a fluctuating electrical field. The shaft has a set of axially-spaced, electrically independent conductive loops positioned so that different loops are proximate to the conductive element for different liquid heights, and an oscillator circuit may be connected to the electrically independent conductive loops to apply an oscillator signal to the loops producing a fluctuating electrical field proximate to the loops. A demodulator circuit connected to the electrically independent conductive loops detects a change in current flow caused by interaction of the conductive element with a fluctuating electrical field for a given loop and a decoder circuit communicating with the demodulator circuit provides a liquid-level output signal based on this detection and indicates a liquid-level height.

It is thus a feature of at least one embodiment of the invention to provide a robust liquid-height sensor. The use of inductive sensing allows a complete encapsulation of the electrical circuit for protection against possibly caustic liquids while the use of multiple independent loops greatly reduces sensitivity of the sensor to manufacturing tolerances and loss of calibration.

The set of axially-spaced, electrically independent conductive loops may be traces on the surface of a printed circuit board.

It is thus a feature of at least one embodiment of the invention to provide a simple method of fabricating the complex loop structure.

The oscillator circuit may sequentially apply the oscillator signal to the loops and/or the demodulator circuit may sequentially detect the current flow in the loops.

It is thus a feature of at least one embodiment of the invention to provide a method of determining the location of the conductive element in the float by evaluating a time in a sequence at which the change in inductance occurs.

The oscillator circuit and demodulator circuit may synchronously apply the oscillator signal to the loop and detect the current flow in the loop.

It is thus a feature of at least one embodiment of the invention to reduce cross coupling between the loops permitting closer loop spacing and/or greater sensitivity in the detection of the conductive element.

The liquid-level sensor may include an analog multiplexer/demultiplexer circuit selectively connecting the oscillator and demodulator to apply the oscillator signal to individual loops and to detect changing current flow in the same loops according to a sequencer circuit and wherein the sequencer circuit communicates with the demodulator circuit to provide the liquid level output.

It is thus a feature of at least one embodiment of the invention to make use of standard integrated circuit components for the sequential interrogation of the independent loops.

The liquid-level sensor may further include multiple multiplexer/demultiplexer circuits connected to a common multiplexer/demultiplexer, the multiple multiplexer/demultiplexer circuits connected to lower order bits of the sequencing circuit and the common multiplexer/demultiplexer connected to higher order bits of the sequencing circuit to provide a single output to the demodulator.

Thus is thus a feature of at least one embodiment of the invention to permit scaling of the invention to an arbitrary number of independent loops.

The conductive element may be a toroid fitting around the shaft to slide therealong.

It is thus a feature of at least one embodiment of the invention to provide a system that minimally constrains the conductive element while ensuring consistent response.

The float may be retained by the shaft to move therealong.

It is thus a feature of at least one embodiment of the invention to make use of inductive coupling to allow a slide fitting between the float and shaft permitting a simplified construction of the sensor where the float is guided by the shaft.

The conductive element may be sealed within the float material.

It is thus a feature of at least one embodiment of the invention to provide a sensor system that may use a metallic conductive element in a corrosive environment by sealing it within, for example, a polymer float material resistant to the caustic substance.

Other features and advantages of the invention will become apparent to those skilled in the art upon review of the following detailed description, claims and drawings in which like numerals are used to designate like features.

DETAILED DESCRIPTION OF THE INVENTION

Figure 1:
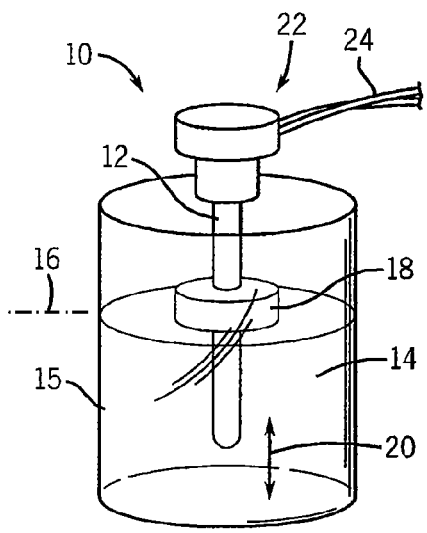
FIG. 1 is a perspective view of the sensor system of the present invention showing a central shaft supporting a float which may move up and down on the shaft as a function of liquid height.

Referring now to FIG. 1, a sensor 10 according to the present invention may have a central cylindrical shaft 12 adapted to extend downward into a liquid 14 held in a tank 15, the liquid having a liquid height 16. The present invention contemplates that the liquid 14 may, for example, be a solution of urea forming part of an emission control system for diesel engines.

Figure 2:
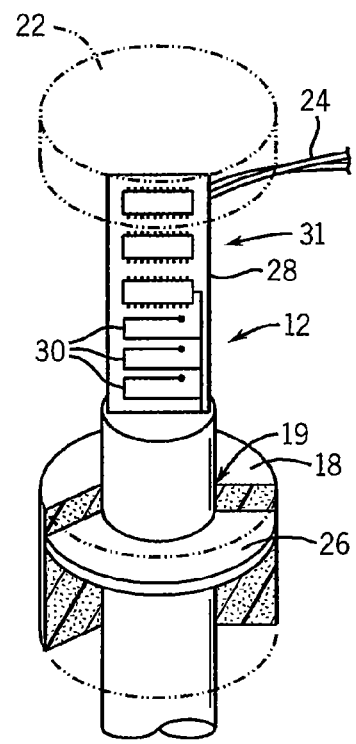
FIG. 2 is a cutaway through the float and the central shaft to reveal an inductance ring within the float and a printed circuit board holding electrically independent loops within the central shaft.

Referring also to FIG. 2, a float 18 having a central cylindrical bore 19 may fit about the cylindrical shaft 12 to slide freely in a vertical direction 20 (as depicted) to rise and fall with changes in the liquid height 16. The material of the float 18 may encapsulate a conductive material 26 embedded therein so that the conductive material 26 is shielded from the liquid 14, the conductive material 26 preferably being in the shape of a ring with the opening of the ring 26 being concentric with the bore 19. In this regard, the material of the float 18 may be, for example, a closed cell or encapsulated foam material having a density such that the overall density of the float 18 including the conductive material 26 is less than the liquid 14.

The conductive material 26 is preferably constructed of a ferromagnetic material such as steel; however, the conductive material 26 may be any material such as will inductively couple to electric fields from the shaft 12 as will be described.

The shaft 12 may be constructed of a liquid-impermeable material, for example, an injection molded thermoplastic and may incorporate therein a printed circuit board 28 extending vertically along its length. The printed circuit board 28 supports multiple electrically independent conductive loops 30 on its front surface communicating with electronic circuitry 31 on an upper portion of the printed circuit board 28 with in a mounting head 22 of the sensor 10. The electronic circuitry 31 of the mounting head 22 may communicate with other components by means of power and signal cabling 24.

Figure 3:
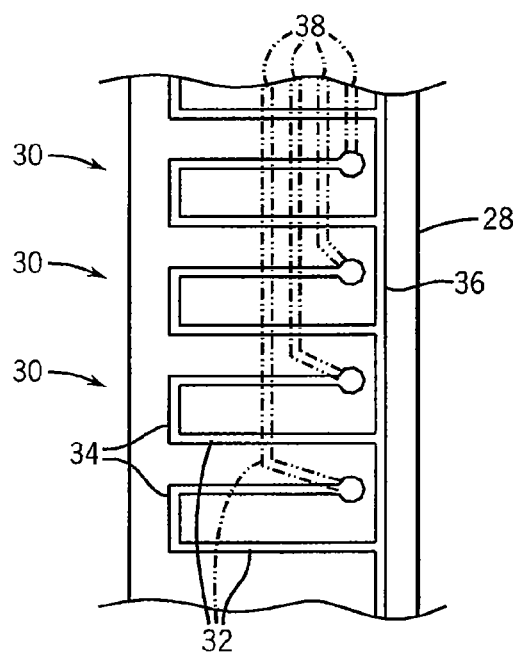
FIG. 3 is an elevational view of the printed circuit board showing the trace pattern.

Referring to FIG. 3, the electrically independent conductive loops 30 may be formed, for example, by conductive traces 32. The traces 32 may form a set of rectangular conductive patterns 34 on the front surface of the board 28, the patterns 34 open at an upper right-hand corner where they join by a conductive via to separate traces 38 on the rear side of the printed circuit board 28 that lead to the electronic circuitry 31 in the mounting head 22. The patterns 34 each share a common return conductor 36 attached to the ends leading from the conductive via, the common return conductor 36 passing vertically along the edge of the printed circuit board 28.

Figure 4:
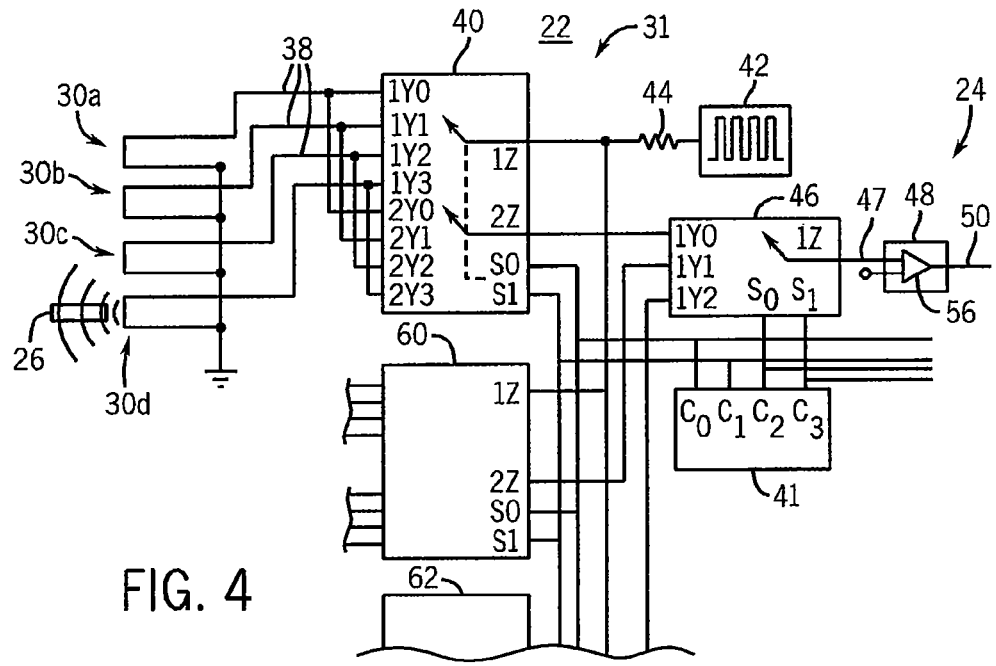
FIG. 4 is a fragmentary schematic showing the use of multiplexer units to separately excite and interrogate the loops of FIGS. 2 and 3.

Referring now to FIG. 4, each of these traces 38 may be received by terminals of both of a corresponding first and second terminal set of an analog multiplexer/demultiplexer 40. The first terminal set is labeled 1Y0-1Y3 and the second terminal set is labeled 2Y0-2Y3. These terminal sets may be selectively and independently connected to terminals 1Z and 2Z according to binary signals received at inputs S0 and S1. In this way, the analog multiplexer/demultiplexer 40 forms a double pole, quadruple throw switch, one poll associated with each of the terminals 1Z and 2Z and a different respective terminal set 1Y0-1Y3 and 2Y0-2Y3.

The binary signals at inputs S0 and S1 may be received from a clock 41, for example, being an oscillator and digital counter of the type well known in the art. In particular, the binary signals at inputs S0 and S1 may be received from two low order bits of the output C0 and C1 of the clock 41. Thus for outputs of the clock 41 ranging in binary value from 0-4, different ones of terminals 1Y0-1Y3 will be connected to 1Z and corresponding different ones of terminals 2Y0-2Y3 will be connected to 2Z. An analog multiplexer/demultiplexer 40 suitable for use with the present invention is manufactured by Philips Semiconductors under the trade name 74HC4052 Dual Four-Channel Analog Multiplexer, Demultiplexer.

Terminal 1Z may be connected to an oscillator 42 through impedance 44 so that with each connection to a terminal 1Y0-1Y3, a high-frequency electrical signal is attached to one of the loops 30 associated with the particular terminal 1Y0-1Y3. This signal is likewise received at terminals 2Y0-2Y3 which sequentially connect to terminal 2Z providing sensed oscillator signal 47 as modified by the loops 30. This sensed oscillator signal 47 is in turn is attached to a terminal 1Y0 of a second analog multiplexer/demultiplexer 46 whose output terminal 1Z is connected to a demodulator 48. The output of the demodulator 48 provides a detection signal 50 indicating whether the loop receiving the oscillator signal is proximate to the conductive material 26.

Figure 5:
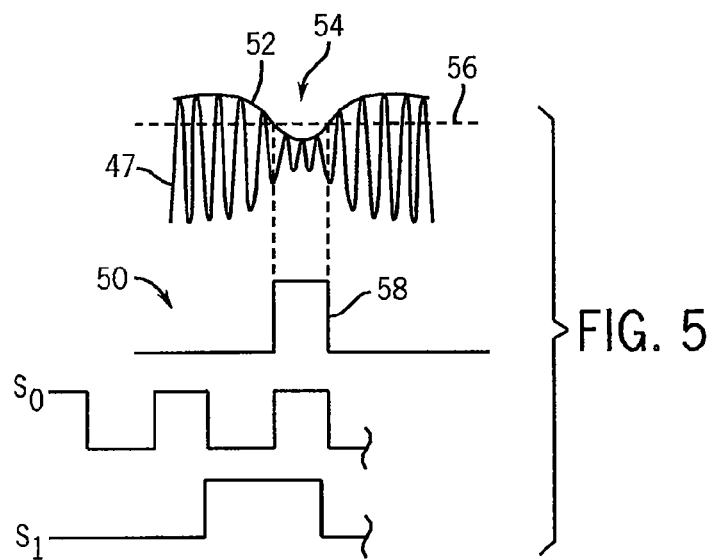
FIG. 5 is a plot of a signal from one of the independent loops demodulated to produce a location pulse.

Referring now to FIG. 5, generally the sensed oscillator signal 47 will have an envelope 52 exhibiting a dip 54 when the sensed oscillator signal 47 is received from a loop 30d (for example) proximate to the conductive material 26. This dip 54 is caused by absorption of energy from the oscillating field by the conductive material 26.

This sensed oscillator signal 47 may be compared to a fixed threshold level 56 by the demodulator 48 which converts the dip 54 into a positive-going pulse 58 that forms the detection signal 50. The detection signal 50 in conjunction with the values of S0 and S1 identify the particular loop 30d from the other loops 30 attached to the analog multiplexer/demultiplexer 40.

Generally, more than four loops 30 will be used and these additional loops 30 (not shown) may be incorporated by using additional multiplexer/demultiplexers 60 and 62. These additional multiplexer/demultiplexers 60 and 62 are connected analogously to analog multiplexer/demultiplexer 40, also receiving signals from clock bits C0 and C1 at corresponding inputs S0 and S1 and receiving the oscillator signal at their terminals 1Z. The terminals 2Z of the multiplexer/demultiplexers 60 and 62 connect to terminals 1Y1 and 1Y2 of analog multiplexer/demultiplexer 46.

The inputs S0 and S1 of the second analog multiplexer/demultiplexer 46 are connected to higher order bits C2 and C3 of the clock 41. It will be understood therefore that under the steady cyclic counting of the clock 41, each of the analog multiplexer/demultiplexers, 40, 60, and 62, cycles through a corresponding set of loops 30 and one of the signals from the analog multiplexer/demultiplexers, 40, 60, and 62, is connected via analog multiplexer/demultiplexer 46 with the demodulator 48. In this way, the detection signal 50 and the outputs from the counter C0-C3 uniquely identify the location of the conductive material 26 proximate to a given loop 30.

The detection signal 50 and the outputs from the clock 41 can be provided, for example, to a microprocessor that may be used to interpret this signal as desired.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A liquid-level sensor comprising:
    a shaft that extends along an axis in a vertical direction in a liquid holding tank;
    a float positioned to move along the shaft with changes in liquid height within the tank wherein the float includes at least one conductive element for interaction with a fluctuating electrical field;
    wherein the shaft has a set of axially-spaced, electrically independent conductive loops positioned so that different loops are proximate to the conductive element for different liquid heights,
    an oscillator circuit connected to the electrically independent conductive loops to apply an oscillator signal to the loops producing a fluctuating electrical field proximate to the loops;
    a demodulator circuit connected to the electrically independent conductive loops to detect a change in current flow caused by interaction of the conductive element with a fluctuating electrical field for a given loop; and
    a decoder circuit communicating with the demodulator circuit to provide a liquid-level output signal indicating a liquid-level height based on an identification of the given loop.

2. The liquid-level sensor of claim 1 wherein the axially-spaced, electrically independent conductive loops are traces on a printed circuit board.

3. The liquid-level sensor of claim 1 wherein the oscillator circuit sequentially applies the oscillator signal to the loops.

4. The liquid-level sensor of claim 1 wherein the demodulator circuit sequentially detects the current flow in the loops.

5. The liquid-level sensor of claim 1 wherein the oscillator circuit and demodulator circuit synchronously apply the oscillator signal to the loop and detect current flow in the loop.

6. The liquid-level sensor of claim 1 wherein the conductive element is a toroid fitting around the shaft.

7. The liquid-level sensor of claim 1 wherein is the float is retained by the shaft to slide therealong.

8. The liquid-level sensor of claim 1 wherein the conductive material is sealed within the float material.

9. The liquid-level sensor of claim 1 further including an analog multiplexer/demultiplexer circuit selectively connecting the oscillator and demodulator to apply the oscillator signal to the given loop and to detect changing current flow in the given loop according to a sequencer circuit and wherein the sequencer circuit communicates with the demodulator circuit to provide the liquid-level height signal.

10. The liquid-level sensor of claim 9 further including multiple multiplexer/demultiplexer circuits connected to a common multiplexer/demultiplexer circuit, the multiple multiplexer/demultiplexer circuits connected to lower order bits of the sequencer circuit and the common multiplexer/demultiplexer connected to higher order bits of the sequencer circuit to provide a single output to the demodulator.

11. A method of detecting liquid height level comprising the steps of: (a) positioning a shaft along an axis extending in a vertical direction in a liquid holding tank, the shaft having a float positioned to move along the shaft with changes in liquid height within the tank wherein the float includes at least one conductive element for interaction with a fluctuating electrical field; wherein the shaft has a set of axially-spaced, electrically independent conductive loops positioned so that different loops are proximate to the conductive element for different liquid heights; (b) applying an oscillator signal to the independent conductive loops; (c) monitoring change in current flow caused by interaction of the conductive element with a fluctuating electrical field for a given loop; and (d) outputting a liquid-level output signal indicating a liquid-level height based on an identification of the given loop; wherein the oscillator signal is applied sequentially to a given conductive loop and not to the conductive loops immediately above or below a given conductive loop.

12. A method of detecting liquid height level comprising the steps of: (a) positioning a shaft along an axis extending in a vertical direction in a liquid holding tank, the shaft having a float positioned to move along the shaft with changes in liquid height within the tank wherein the float includes at least one conductive element for interaction with a fluctuating electrical field; wherein the shaft has a set of axially-spaced, electrically independent conductive loops positioned so that different loops are proximate to the conductive element for different liquid heights; (b) applying an oscillator signal to the independent conductive loops; (c) monitoring change in current flow caused by interaction of the conductive element with a fluctuating electrical field for a given loop; and (d) outputting a liquid-level output signal indicating a liquid-level height based on an identification of the given loop; wherein changing current flow is detected sequentially at given conductive loops and not at adjacent conductive loops immediately above or below the given conductive loop.

13. A method of detecting liquid height level comprising the steps of: (a) positioning a shaft along an axis extending in a vertical direction in a liquid holding tank, the shaft having a float positioned to move along the shaft with changes in liquid height within the tank wherein the float includes at least one conductive element for interaction with a fluctuating electrical field; wherein the shaft has a set of axially-spaced, electrically independent conductive loops positioned so that different loops are proximate to the conductive element for different liquid heights; (b) applying an oscillator signal to the independent conductive loops; (c) monitoring change in current flow caused by interaction of the conductive element with a fluctuating electrical field for a given loop; and (d) outputting a liquid-level output signal indicating a liquid-level height based on an identification of the given loop; wherein the oscillator signal is applied sequentially to the given conductive loop and not to the conductive loops immediately above or below a given conductive loop.

* * * * *